(12) United States Patent
Schwindaman et al.

(10) Patent No.: US 11,059,413 B2
(45) Date of Patent: Jul. 13, 2021

(54) RETRACTABLE ROOM ACTUATION ASSEMBLY FOR RECREATIONAL VEHICLE

(71) Applicant: LIPPERT COMPONENTS MANUFACTURING, INC., Elkhart, IN (US)

(72) Inventors: Michael A. Schwindaman, Cassopolis, MI (US); Thomas J. Rogers, Cassopolis, MI (US); Michael W. Howard, Elkhart, IN (US)

(73) Assignee: LIPPERT COMPONENTS MANUFACTURING, INC., Elkhart, IN (US)

( * ) Notice: Subject to any disclaimer, the term of this patent is extended or adjusted under 35 U.S.C. 154(b) by 0 days.

(21) Appl. No.: 16/659,910

(22) Filed: Oct. 22, 2019

(65) Prior Publication Data

US 2020/0047658 A1  Feb. 13, 2020

Related U.S. Application Data

(60) Continuation of application No. 16/152,843, filed on Oct. 5, 2018, now Pat. No. 10,471,878, which is a
(Continued)

(51) Int. Cl.
*B60K 6/36* (2007.10)
*B60P 3/34* (2006.01)

(52) U.S. Cl.
CPC .......... *B60P 3/34* (2013.01); *Y10T 29/49622* (2015.01)

(58) Field of Classification Search
CPC ................. H02P 1/00; B60P 3/34; B60P 3/36
See application file for complete search history.

(56) References Cited

U.S. PATENT DOCUMENTS

| 1,279,819 A | 9/1918 | Zingsheim et al. |
| 1,521,635 A | 1/1925 | Lewis |
| (Continued) | | |

FOREIGN PATENT DOCUMENTS

| AU | 8532575 | 4/1977 |
| CA | 2136673 | 3/1996 |
| (Continued) | | |

OTHER PUBLICATIONS

*AL-KO Kober, LLC* v. *Schwindaman et al.*, "Petition for Inter Partes Review of U.S. Pat. No. 8,235,455 under 35 U.S.C. §§ 311-319 and 37 C.F.R. § 42.100 ET SEQ.," Docket No. 715542, Case IPR2014-00213, U.S. Pat. No. 8,235,455, incl. Declaration of Dr. Frank J. Fronczak (Dec. 2, 2013).

*AL-KO Kober, LLC* v. *Schwindaman et al.*, "Corrected Petition for Inter Partes Review of U.S. Pat. No. 8,235,455 under 35 U.S.C. §§ 311-319 and 37 C.F.R. § 42.100 ET SEQ.," Paper No. 5, Case IPR2014-00213, U.S. Pat. No. 8,235,455, incl. Declaration of Dr. Frank J. Fronczak (Dec. 20, 2013).

(Continued)

*Primary Examiner* — Karen Masih
(74) *Attorney, Agent, or Firm* — Nixon & Vanderhye P.C.

(57) ABSTRACT

A slide-out or retractable room for a mobile living quarters, such as a recreational vehicle, is provided with actuating assemblies mounted on opposite side walls of the slide-out room and the adjacent wall of the main living area. The actuating assemblies include a pair of parallel gear racks mounted on the side wall, which are engaged by pinions rotated by torque shafts mounted on the main living quarters. Each torque shaft is rotated by a separate motor. A roller engages a bearing surface on the lower portion of the gear racks. Accordingly, the slide-out room is extended and retracted by rotating the torque shafts to cause the gear racks and the attached slide-out room to extend and retract. The weight of the slide-out room is supported by the rollers, thereby supporting the slide-out room off of the floor of the main living quarters as it extends and retracts.

20 Claims, 9 Drawing Sheets

Related U.S. Application Data continuation of application No. 15/618,601, filed on Jun. 9, 2017, now Pat. No. 10,093,219, which is a continuation of application No. 14/942,446, filed on Nov. 16, 2015, now Pat. No. 9,694,733, which is a continuation of application No. 14/041,033, filed on Sep. 30, 2013, now Pat. No. 9,193,291, which is a continuation of application No. 13/495,500, filed on Jun. 13, 2012, now Pat. No. 8,581,540, which is a division of application No. 13/180,687, filed on Jul. 12, 2011, now Pat. No. 8,317,250, which is a division of application No. 12/683,332, filed on Jan. 6, 2010, now Pat. No. 8,016,343.

(60) Provisional application No. 61/205,551, filed on Jan. 21, 2009.

(56) References Cited

U.S. PATENT DOCUMENTS

| | | | |
|---|---|---|---|
| 2,136,130 | A | 11/1938 | Gorlenko |
| 2,561,921 | A | 7/1951 | Guillot |
| 2,704,233 | A | 3/1955 | Schjolin |
| 2,744,781 | A | 5/1956 | Black |
| 2,813,747 | A | 11/1957 | Rice, Jr. |
| 2,877,509 | A | 3/1959 | Klibanow |
| 2,965,412 | A | 12/1960 | Henderson et al. |
| 2,987,342 | A | 6/1961 | Meaker et al. |
| 2,995,398 | A | 8/1961 | Davenport |
| 3,106,750 | A | 10/1963 | Jarman |
| 3,137,041 | A | 6/1964 | Mullen |
| 3,169,280 | A | 2/1965 | Jarman |
| 3,181,910 | A | 5/1965 | Thomas |
| 3,288,518 | A | 11/1966 | Oliver |
| 3,469,356 | A | 9/1969 | White |
| 3,740,088 | A | 6/1973 | Ratcliff |
| 3,884,520 | A | 5/1975 | Peterson |
| 3,888,539 | A | 6/1975 | Niessner |
| 3,967,170 | A | 6/1976 | MacDonald et al. |
| 4,049,310 | A | 9/1977 | Yoder |
| 4,080,699 | A | 3/1978 | Anderson |
| 4,128,269 | A | 12/1978 | Stewart |
| 4,133,571 | A | 1/1979 | Fillios |
| 4,253,283 | A | 3/1981 | May |
| 4,351,135 | A | 9/1982 | Freller |
| 4,500,132 | A | 2/1985 | Yoder |
| 4,657,300 | A | 4/1987 | Penny et al. |
| 4,711,257 | A | 12/1987 | Kobayashi |
| 4,900,217 | A | 2/1990 | Nelson |
| 4,930,837 | A | 6/1990 | Marsh et al. |
| 5,050,927 | A | 9/1991 | Montanari |
| 5,061,006 | A | 10/1991 | Baughman |
| 5,102,179 | A | 4/1992 | Royer |
| 5,154,469 | A | 10/1992 | Morrow |
| 5,237,782 | A | 8/1993 | Cooper |
| 5,248,180 | A | 9/1993 | Hussaini |
| 5,295,430 | A | 3/1994 | Dewald et al. |
| 5,332,276 | A | 7/1994 | Blodgett, Jr. |
| 5,333,420 | A | 8/1994 | Eden |
| 5,491,933 | A | 2/1996 | Miller et al. |
| 5,560,444 | A | 10/1996 | Tiedge |
| 5,560,667 | A | 10/1996 | Edry |
| 5,577,351 | A | 11/1996 | Dewald, Jr. et al. |
| 5,586,802 | A | 12/1996 | Dewald, Jr. et al. |
| 5,634,683 | A | 6/1997 | Young |
| 5,706,612 | A | 1/1998 | Tillett |
| 5,758,918 | A | 6/1998 | Schneider et al. |
| 5,791,715 | A | 8/1998 | Nebel |
| 5,800,002 | A | 9/1998 | Tiedge et al. |
| 5,829,822 | A | 11/1998 | Tiedge |
| 5,833,296 | A | 11/1998 | Schneider |
| 5,857,733 | A | 1/1999 | Dewald, Jr. et al. |
| 5,860,686 | A | 1/1999 | Tiedge |
| 5,894,698 | A | 4/1999 | Dewald et al. |
| 5,902,001 | A | 5/1999 | Schneider |
| 5,909,935 | A | 6/1999 | Esperandieu et al. |
| 5,915,774 | A | 6/1999 | Tiedge |
| 5,971,471 | A | 10/1999 | Gardner |
| 5,984,396 | A | 11/1999 | Schneider |
| 6,003,919 | A | 12/1999 | Shook |
| 6,108,983 | A | 8/2000 | Dewald, Jr. et al. |
| 6,109,683 | A | 8/2000 | Schneider |
| 6,116,671 | A | 9/2000 | Schneider |
| 6,152,520 | A | 11/2000 | Gardner |
| 6,176,045 | B1 | 1/2001 | McManus et al. |
| 6,182,401 | B1 | 2/2001 | McManus et al. |
| 6,202,362 | B1 | 3/2001 | McManus et al. |
| 6,227,607 | B1 | 5/2001 | Dewald et al. |
| 6,234,566 | B1 | 5/2001 | Cyr et al. |
| 6,254,171 | B1 | 7/2001 | Young, Sr. |
| 6,286,883 | B1 | 9/2001 | Schneider et al. |
| 6,293,611 | B1 | 9/2001 | Schneider et al. |
| 6,325,437 | B2 | 12/2001 | Hiebert et al. |
| 6,338,523 | B1 | 1/2002 | Rasmussen |
| 6,345,854 | B1 | 2/2002 | McManus |
| 6,354,646 | B1 | 3/2002 | McManus et al. |
| 6,402,216 | B1 | 6/2002 | McManus et al. |
| 6,415,675 | B1 | 7/2002 | Schneider et al. |
| 6,422,628 | B1 | 7/2002 | Bortell |
| 6,454,336 | B1 | 9/2002 | Nye et al. |
| 6,471,275 | B1 | 10/2002 | Kunz et al. |
| 6,494,518 | B2 | 12/2002 | Kreil et al. |
| 6,497,449 | B2 | 12/2002 | Graf et al. |
| 6,527,324 | B2 | 3/2003 | McManus et al. |
| 6,536,821 | B1 | 3/2003 | Gardner |
| 6,536,823 | B2 | 3/2003 | McManus |
| 6,568,734 | B2 | 5/2003 | Buls et al. |
| 6,572,170 | B2 | 6/2003 | McManus et al. |
| 6,575,514 | B2 | 6/2003 | McManus et al. |
| 6,598,354 | B2 | 7/2003 | McManus et al. |
| 6,601,896 | B1 | 8/2003 | Nye et al. |
| 6,619,713 | B2 | 9/2003 | Eichhorn |
| 6,619,714 | B2 | 9/2003 | Schneider et al. |
| 6,623,066 | B2 | 9/2003 | Garceau et al. |
| 6,637,794 | B2 | 10/2003 | McManus et al. |
| 6,679,541 | B1 | 1/2004 | Hanser et al. |
| 6,681,531 | B2 | 1/2004 | McManus |
| 6,685,249 | B2 | 2/2004 | Schneider |
| 6,696,813 | B2 | 2/2004 | McManus |
| 6,702,353 | B1 | 3/2004 | Blodgett, Jr. |
| 6,729,669 | B2 | 5/2004 | McManus et al. |
| 6,729,670 | B1 | 5/2004 | Buls et al. |
| 6,783,164 | B2 | 8/2004 | Bortell et al. |
| 6,796,590 | B2 | 9/2004 | Schneider |
| 6,802,555 | B2 | 10/2004 | Yoder et al. |
| 6,805,391 | B2 | 10/2004 | Schneider |
| 6,871,897 | B1 | 3/2005 | Snyder |
| 6,896,307 | B2 | 5/2005 | Nye et al. |
| 6,905,154 | B1 | 6/2005 | Buls et al. |
| 6,932,403 | B2 | 8/2005 | Meijer et al. |
| 6,948,754 | B2 | 9/2005 | Huffman et al. |
| 6,976,721 | B2 | 12/2005 | Rasmussen |
| 6,981,728 | B2 | 1/2006 | Rasmussen et al. |
| 7,004,528 | B2 | 2/2006 | Nye et al. |
| 7,040,689 | B2 | 5/2006 | Few et al. |
| 7,052,064 | B2 | 5/2006 | Rasmussen |
| 7,052,065 | B2 | 5/2006 | Rasmussen |
| 7,073,844 | B2 | 7/2006 | Garceau et al. |
| 7,150,483 | B2 | 12/2006 | Rasmussen |
| 7,175,219 | B1 | 2/2007 | Blodgett, Jr. |
| 7,204,536 | B2 | 4/2007 | Kunz |
| 7,210,269 | B2 | 5/2007 | Garceau et al. |
| 7,229,123 | B2 | 6/2007 | Kunz |
| 7,234,747 | B2 | 6/2007 | Rasmussen |
| 7,258,382 | B2 | 8/2007 | Kunz et al. |
| 7,258,389 | B2 | 8/2007 | Franzini |
| 7,322,628 | B2 | 1/2008 | Kunz |
| 7,354,088 | B2 | 4/2008 | Garceau et al. |
| 7,360,815 | B2 | 4/2008 | Kunz et al. |
| 7,360,821 | B2 | 4/2008 | Kunz |
| 7,370,900 | B1 | 5/2008 | Blodgett, Jr. |
| 7,374,218 | B2 | 5/2008 | Schneider |
| 7,407,211 | B2 | 8/2008 | Kunz |

(56) References Cited

U.S. PATENT DOCUMENTS

| | | | |
|---|---|---|---|
| 7,427,092 | B2 | 9/2008 | Wolf et al. |
| 7,461,480 | B1 | 12/2008 | Gardner |
| 7,540,549 | B2 | 6/2009 | Revelino et al. |
| 7,607,365 | B1 | 10/2009 | Courser |
| 7,614,675 | B2 | 11/2009 | Kunz |
| 7,802,834 | B2 | 9/2010 | Cadena et al. |
| 7,871,114 | B2 | 1/2011 | Schultz et al. |
| 8,016,343 | B2 | 9/2011 | Schwindaman et al. |
| 8,042,853 | B2 | 10/2011 | Garceau |
| 8,141,927 | B2 | 3/2012 | Kreil |
| 8,235,455 | B2 | 8/2012 | Schwindaman et al. |
| 8,240,744 | B2 | 8/2012 | Schwindaman et al. |
| 8,317,250 | B2 | 11/2012 | Schwindaman et al. |
| 8,573,666 | B2 | 11/2013 | Schwindaman et al. |
| 8,581,540 | B2 | 11/2013 | Schwindaman et al. |
| 9,193,291 | B2 | 11/2015 | Schwindaman et al. |
| 9,694,733 | B2 | 7/2017 | Schwindaman et al. |
| 10,093,219 | B2 | 10/2018 | Schwindaman et al. |
| 2002/0023393 | A1* | 2/2002 | McManus ................. B60P 3/34 52/67 |
| 2002/0060467 | A1 | 5/2002 | McManus et al. |
| 2002/0084664 | A1 | 7/2002 | McManus et al. |
| 2002/0180232 | A1 | 12/2002 | Schneider et al. |
| 2003/0155791 | A1 | 8/2003 | Gurdijian et al. |
| 2004/0094983 | A1 | 5/2004 | Bortell |
| 2005/0062305 | A1 | 3/2005 | Blaudow |
| 2005/0230989 | A1 | 10/2005 | Nebel |
| 2006/0113822 | A1 | 6/2006 | Kunz |
| 2006/0162067 | A1 | 7/2006 | Roepke |
| 2008/0265618 | A1 | 10/2008 | Cadena et al. |
| 2009/0057466 | A1 | 3/2009 | Choi et al. |
| 2009/0192691 | A1 | 7/2009 | O'Connor et al. |
| 2009/0261610 | A1 | 10/2009 | Kreil |
| 2009/0309382 | A1 | 12/2009 | Moore et al. |
| 2010/0066025 | A1 | 3/2010 | Kreil |
| 2011/0144805 | A1 | 6/2011 | Chiappetta et al. |
| 2011/0156430 | A1 | 6/2011 | Gardner |
| 2013/0037068 | A1 | 2/2013 | Cutler |
| 2013/0106130 | A1* | 5/2013 | Yoder ...................... F16H 19/04 296/26.02 |
| 2014/0175822 | A1* | 6/2014 | Kreil ........................ B60P 3/34 296/26.13 |
| 2014/0197655 | A1 | 7/2014 | Stichter |
| 2015/0008695 | A1 | 1/2015 | Yoder |
| 2017/0080842 | A1* | 3/2017 | Rodabaugh ............... B60P 3/34 |
| 2018/0347677 | A1 | 12/2018 | Carlson |

FOREIGN PATENT DOCUMENTS

| | | |
|---|---|---|
| DE | 1095137 | 12/1960 |
| EP | 0065398 | 11/1982 |
| EP | 1157885 | 11/2001 |
| EP | 1283405 | 2/2003 |
| EP | 1647446 | 4/2006 |
| JP | 10059058 | 3/1998 |
| WO | WO 1998/056613 | 12/1998 |
| WO | WO 2000/038948 | 7/2000 |
| WO | WO 2000/069095 | 11/2000 |
| WO | WO 2002/020309 | 3/2002 |
| WO | WO 2010/015062 | 2/2010 |

OTHER PUBLICATIONS

*AL-KO Kober, LLC v. Lippert Components Manufacturing, Inc.*, "Petition for Inter Partes Review of U.S. Pat. No. 8,573,666 under 35 U.S.C. §§ 311-319 and 37 C.F.R. § 42.100 ET SEQ.," Docket No. 715542, Case IPR2014-00313, U.S. Pat. No. 8,573,666, incl. Declaration of Dr. Frank J. Fronczak (Dec. 31, 2013).

*AL-KO Kober, LLC v. Lippert Components Manufacturing, Inc.*, "Corrected Petition for Inter Partes Review of U.S. Pat. No. 8,573,666 under 35 U.S.C. §§ 311-319 and 37 C.F.R. §42.100 ET SEQ.," Paper No. 6, Case IPR2014-00313, U.S. Pat. No. 8,573,666, incl. Declaration of Dr. Frank J. Fronczak (Jan. 23, 2014).

*AL-KO Kober, LLC v. Lippert Components Manufacturing, Inc.*, "Second Corrected Petition for Inter Partes Review of U.S. Pat. No. 8,573,666 under 35 U.S.C. §§ 311-319 and 37 C.F.R. § 42.100 ET SEQ.," Paper No. 8, Case IPR2014-00313, U.S. Pat. No. 8,573,666, incl. Declaration of Dr. Frank J. Fronczak (Feb. 10, 2014).

*AL-KO Kober, LLC v. Schwindaman et al.*, Petition for Inter Partes Review of U.S. Pat. No. 8,240,744 under 35 U.S.C. §§ 311-319 and 37 C.F.R. § 42.100 ET SEQ., Docket No. 715542, Case IPR2014-00211, U.S. Pat. No. 8,240,744, incl. Declaration of Dr. Frank J. Fronczak (Dec. 2, 2013).

*AL-KO Kober, LLC v. Schwindaman et al.*, "Corrected Petition for Inter Partes Review of U.S. Pat. No. 8,240,744 under 35 U.S.C. §§ 311-319 and 37 C.F.R. § 42.100 ET SEQ.," Paper No. 5, Case IPR2014-00211, U.S. Pat. No. 8,240,744, incl. Declaration of Dr. Frank J. Fronczak (Dec. 20, 2013).

*AL-KO Kober, LLC v. Lippert Components Manufacturing, Inc.*, "Patent Owner's Response," Paper No. 15, Case IPR2014-00313, U.S. Pat. No. 8,573,666 (Sep. 8, 2014).

*AL-KO Kober, LLC v. Lippert Components Manufacturing, Inc.*, "Petitioner's Reply to Patent Owners' Response to Petition," Paper No. 21, Case IPR2014-00313, U.S. Pat. No. 8,573,666 (Dec. 19, 2014).

*AL-KO Kober, LLC v. Lippert Components Manufacturing, Inc.*, "Decision—Denying Institution of Inter Partes Review 37 C.F.R. § 42.108," Paper No. 7, Case IPR2014-00213, U.S. Pat. No. 8,235,455 (Jun. 6, 2014).

*AL-KO Kober, LLC v. Lippert Components Manufacturing, Inc.*, Decision—Institution of Inter Partes Review 37 C.F.R. § 42.108, Paper No. 9, Case IPR2014-00313 U.S. Pat. No. 8,573,666 (Jun. 6, 2014).

*AL-KO Kober, LLC v. Lippert Components Manufacturing, Inc.*, Decision—Denying Institution of Inter Partes Review 37 C.F.R. § 42.108, Paper No. 7, Case IPR2014-00211, U.S. Pat. No. 8,240,744 (Jun. 6, 2014).

*AL-KO Kober, LLC v. Lippert Components Manufacturing, Inc.*, "Deposition of Frank J. Fronczak," Inter Partes Review of U.S. Pat. No. 8,573,666, Docket No. 715542 (Aug. 21, 2014).

*AL-KO Kober, LLC v. Lippert Components Manufacturing, Inc.*, "Deposition of Massoud S. Tavakoli," Case IPR2014-00313, U.S. Pat. No. 8,573,666 (Dec. 10, 2014).

*AL-KO Kober, LLC v. Lippert Components Manufacturing, Inc.*, Declaration of Dr. Massoud S. Tavakoli, Case IPR2014-00313, U.S. Pat. No. 8,573,666 (Sep. 8, 2014).

Australian Patent Examination Report No. 1 dated Mar. 27, 2014 issued in Australian Patent Application No. 2010246535.

"Drew Industries Acquires Rights to New RV Components Including Innovative Wall Slide," PR Newswire, http://www.prnewswire.com/news-releases/drew-industries-acquires-rights-to-new-rv-components-including-innovative-wall-slide-87853762.html, pp. 1-3, obtained from internet on Apr. 4, 2014.

European Examination Report dated Jul. 28, 2014 issued in European Patent Application No. 10189732.0.

European Search Report dated Apr. 11, 2011 issued in European Patent Application No. 10189732.0.

Inter Partes Review Case No. 2014-00211 of U.S. Pat. No. 8,240,744, Filing Date Dec. 12, 2013.

Inter Partes Review Case No. 2014-00213 of U.S. Pat. No. 8,235,455, Filing Date Dec. 12, 2013.

Inter Partes Review Case No. 2014-00313 of U.S. Pat. No. 8,573,666, Filing Date Dec. 31, 2013.

*Lippert Components Manufacturing, Inc. v. AL-KO Kober, LLC*, Defendant AL-KO Kober, LLC's Preliminary Invalidity Contentions, Civil Action No. 3:13-cv-00697-JVB-CAN, including Exhibits A-E (Apr. 7, 2014).

WIT Club News, "Service Tips, Slideout Rooms," 2001, pp. 1-5.

\* cited by examiner

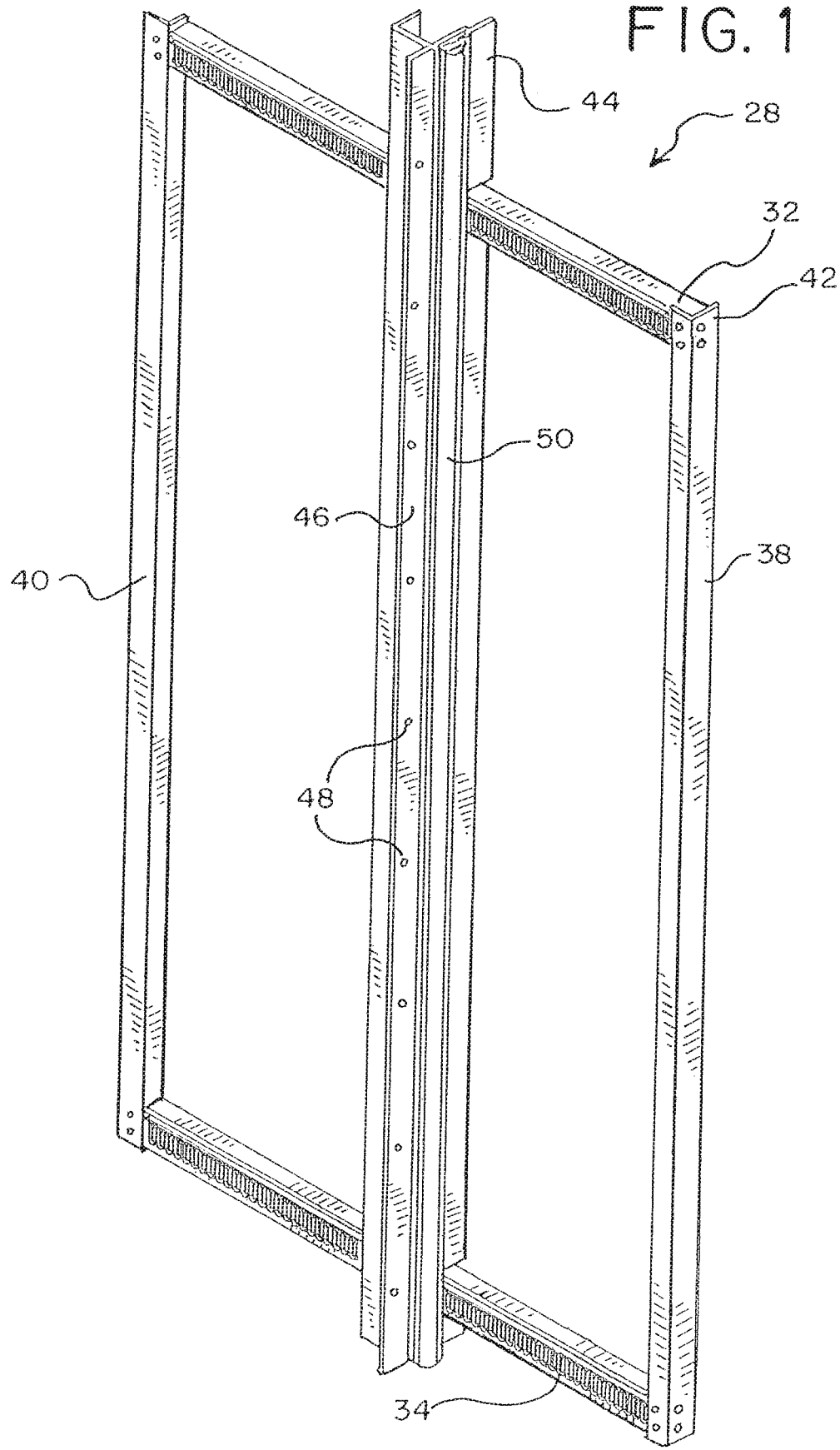

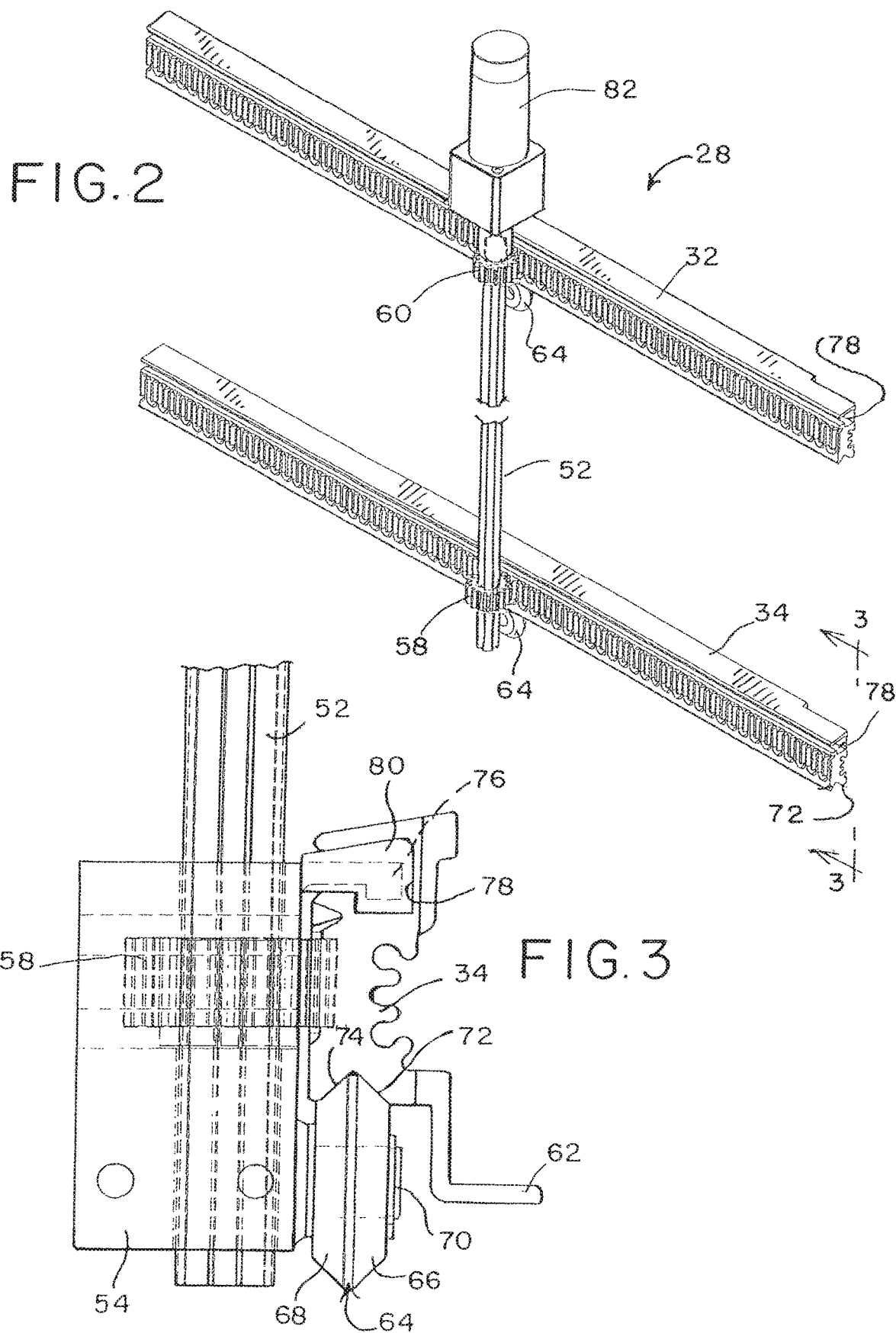

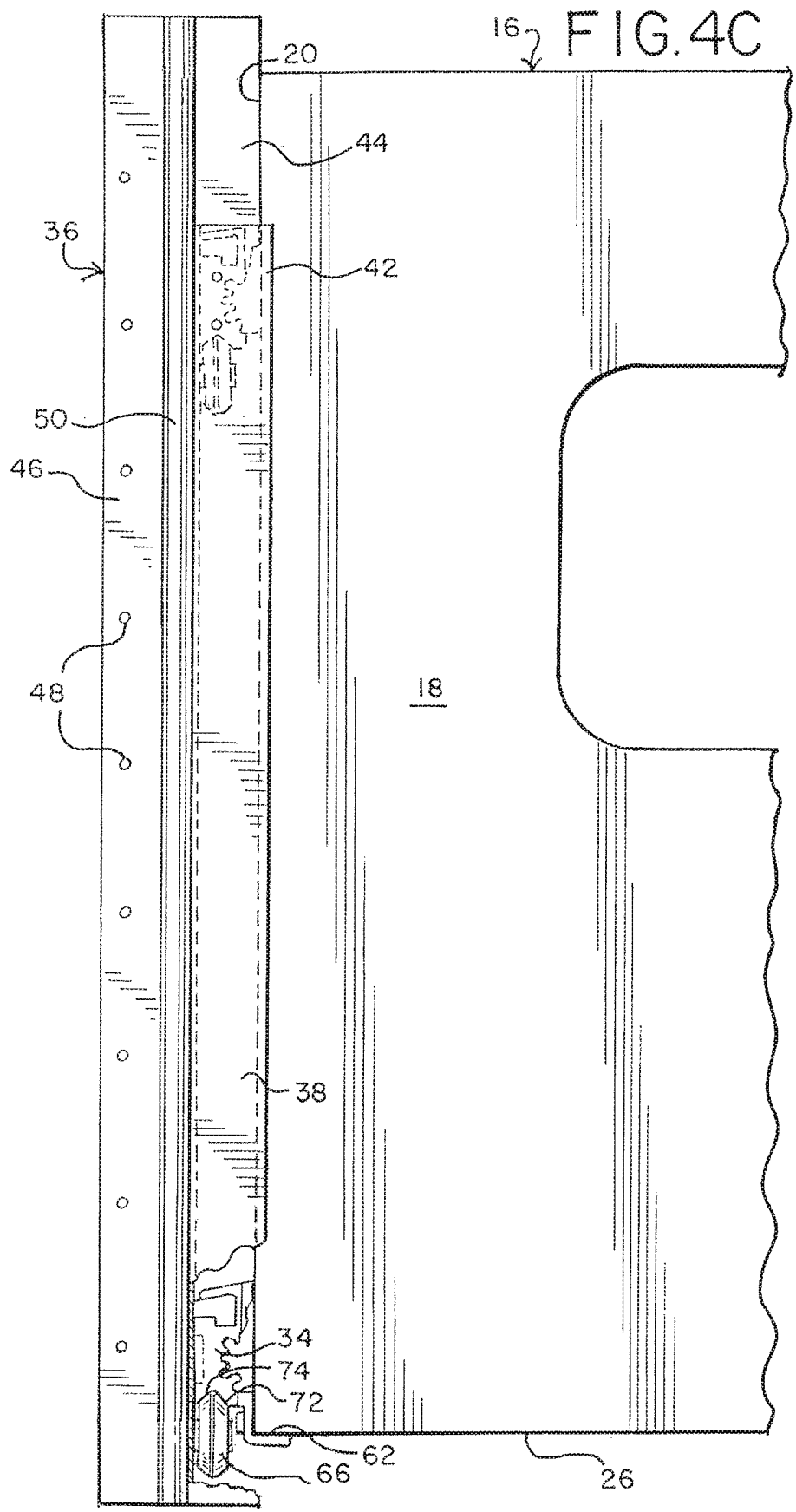

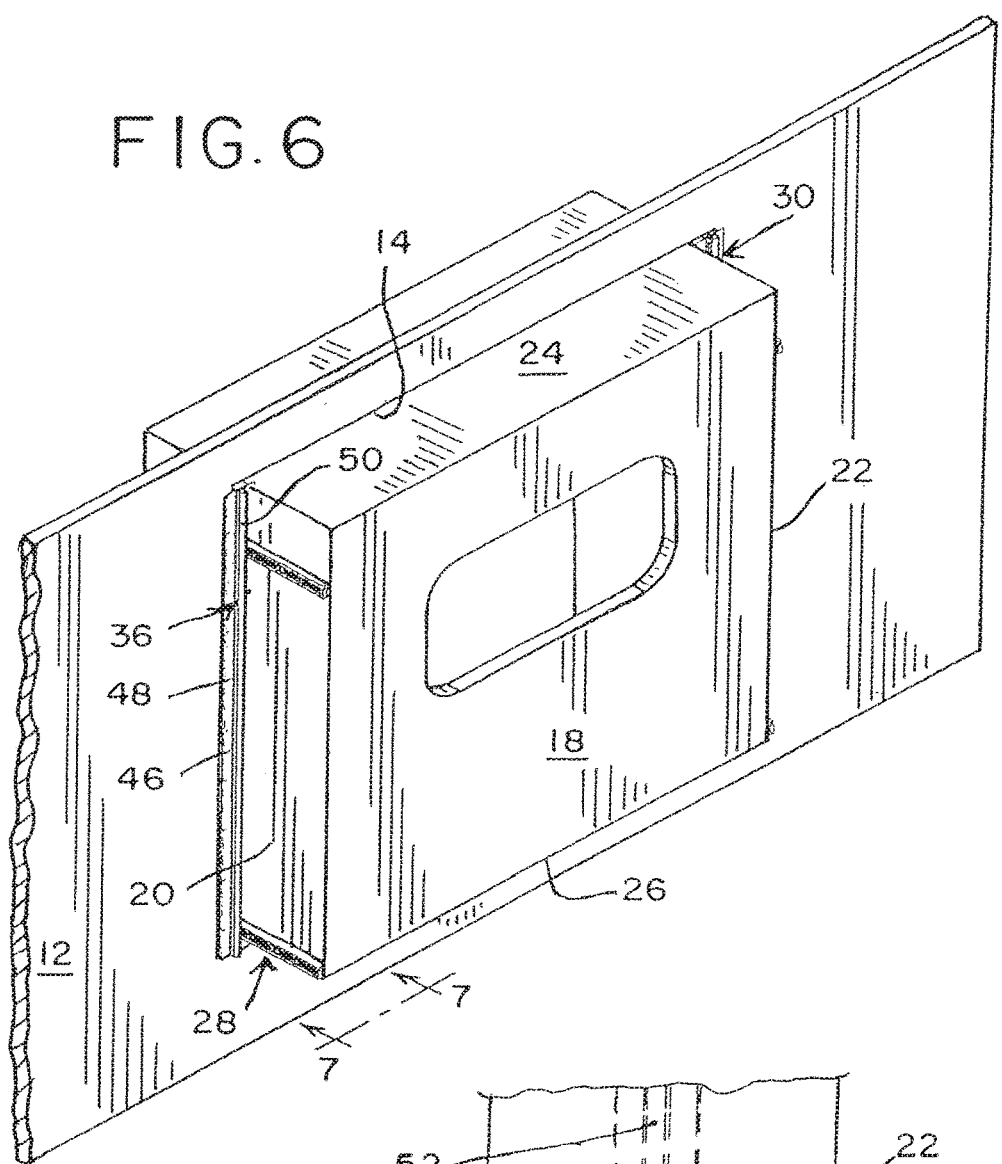
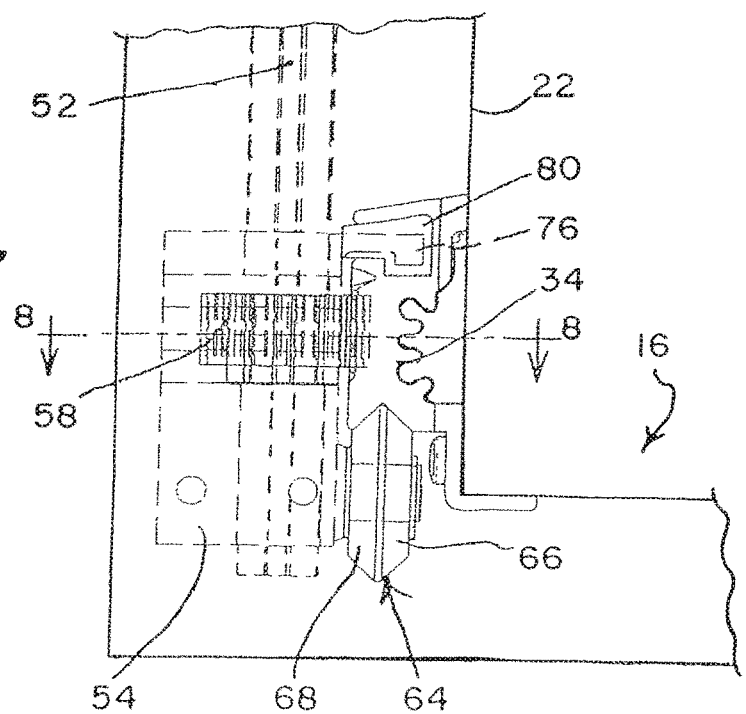

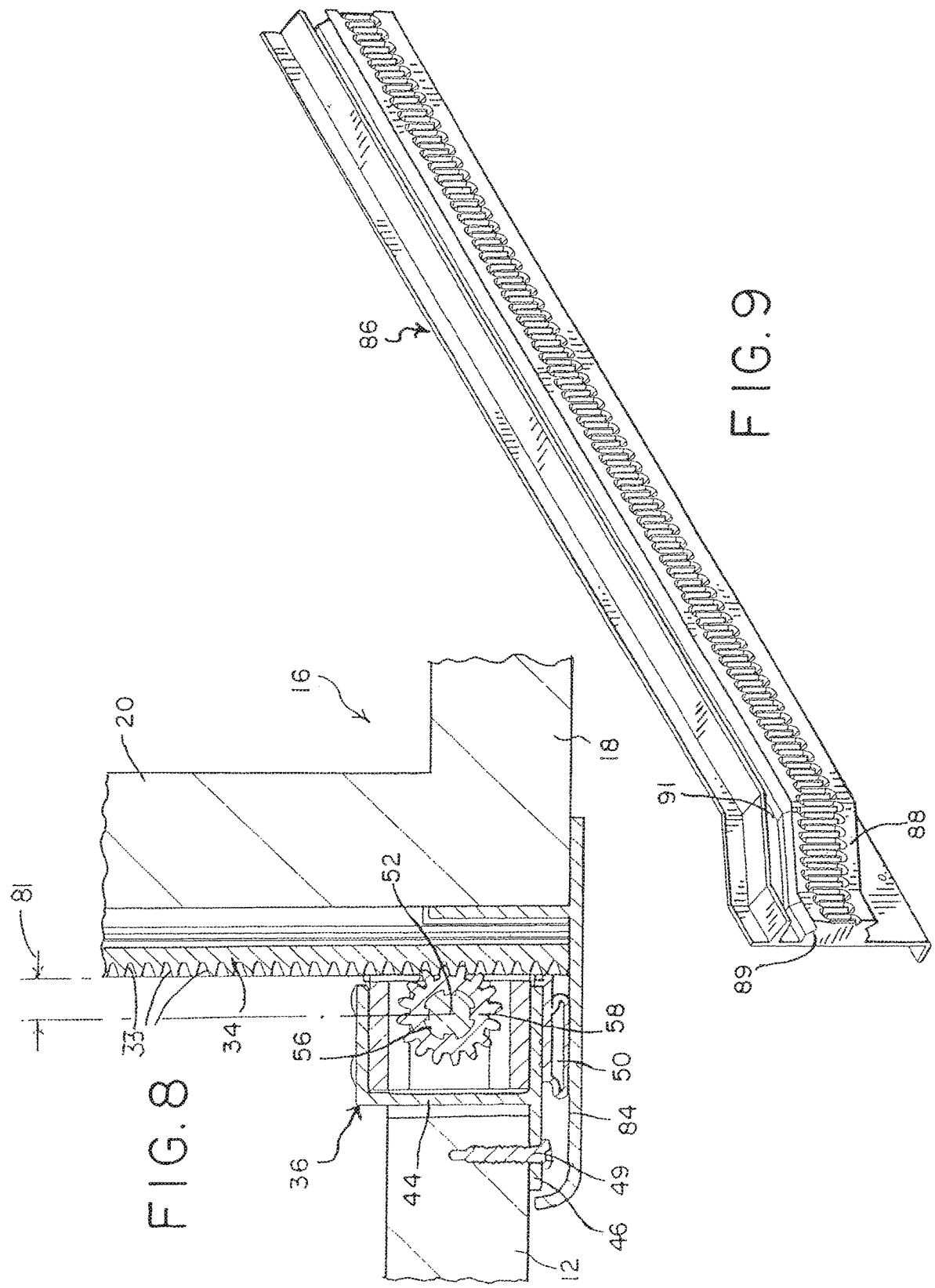

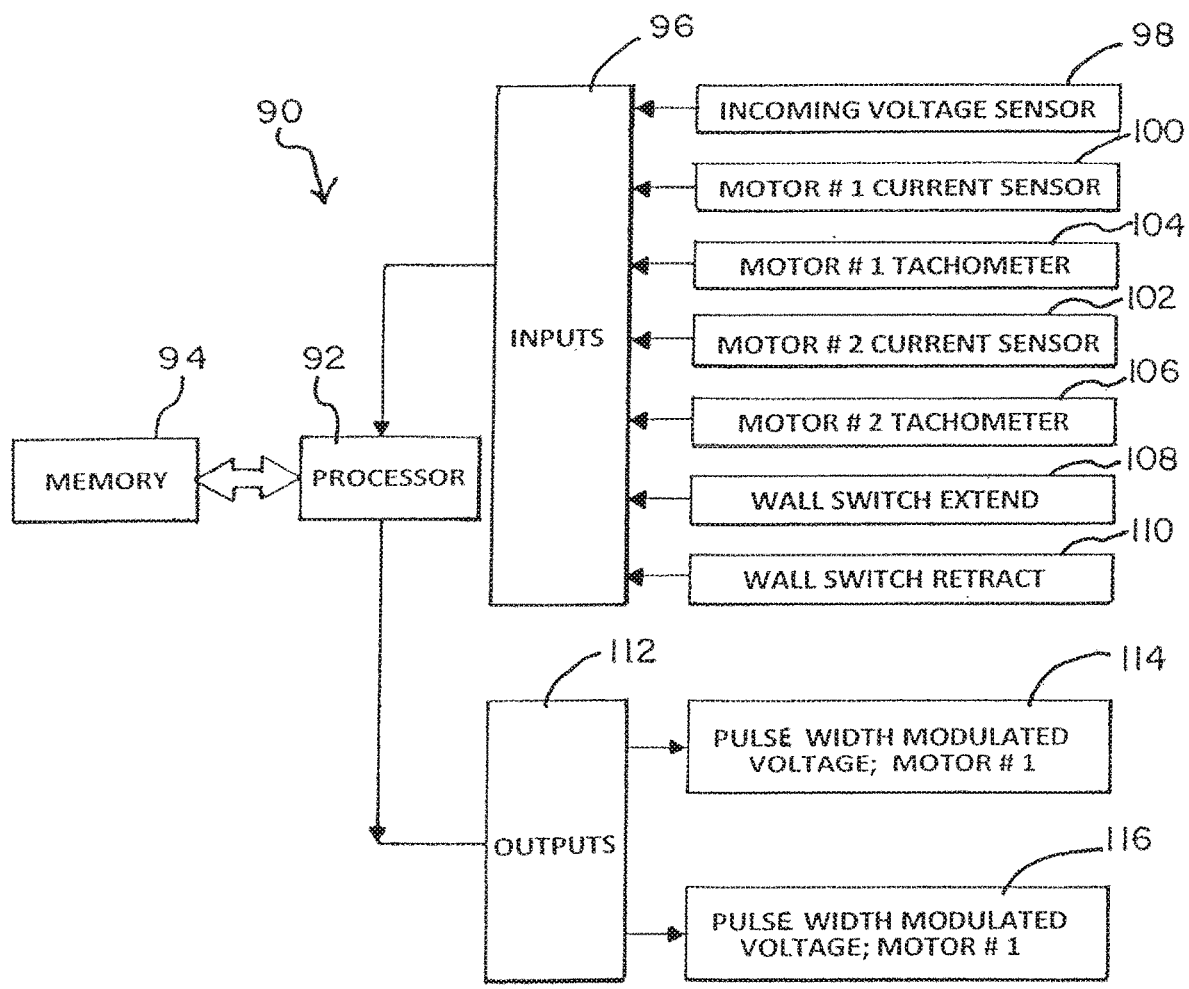

RETRACTABLE ROOM ACTUATION ASSEMBLY FOR RECREATIONAL VEHICLE

CROSS REFERENCES TO RELATED APPLICATIONS

This application is a continuation of U.S. patent application Ser. No. 16/152,843, filed Oct. 5, 2018, pending, which is a continuation of U.S. patent application Ser. No. 15/618,601, filed Jun. 9, 2017, now U.S. Pat. No. 10,093,219, which is a continuation of U.S. patent application Ser. No. 14/942,446, filed Nov. 16, 2015, now U.S. Pat. No. 9,694,733, which is a continuation of U.S. patent application Ser. No. 14/041,033, filed Sep. 30, 2013, now U.S. Pat. No. 9,193,291, which is a continuation of U.S. patent application Ser. No. 13/495,500, filed Jun. 13, 2012, now U.S. Pat. No. 8,581,540, which is a division of U.S. patent application Ser. No. 13/180,687, filed Jul. 12, 2011, now U.S. Pat. No. 8,317,250, which is a division of U.S. patent application Ser. No. 12/683,332, filed Jan. 6, 2010, now U.S. Pat. No. 8,016,343, which claims the benefit of U.S. Provisional Patent Application No. 61/205,551, filed Jan. 21, 2009, the entire contents of each of which are hereby incorporated by reference in this application.

STATEMENT REGARDING FEDERALLY SPONSORED RESEARCH OR DEVELOPMENT (NOT APPLICABLE)

BACKGROUND

This invention relates to a slide-out or retractable room for mobile living quarters, such as a recreation vehicle.

Recreational vehicles, such as motor homes, fifth-wheel trailers, and travel trailers may be provided with a retractable or slide-out room for increasing the living space of the vehicle. The retractable or slide-out room is extended for use when the vehicle is parked and is retracted into the main living area of the vehicle when the vehicle is to be moved. Existing retractable or slide-out rooms can be time-consuming and difficult to install. Frequently, the operating mechanisms consist of many separate components that must be individually installed, connected and adjusted by highly-trained employees when the unit is assembled. After the vehicle is put into service, adjustments by the vehicle owner are often necessary. Furthermore, existing slide-out rooms require substantial space for mounting large electrical motors and hydraulic units that require the construction of expensive covers and thus reduce the overall space inside the vehicle. Such slide-out or retractable rooms are generally moved in and out of the vehicle across the floor of the main living area. Because the slide-out or retractable room is exposed to weather when extended, extension and retraction of the slide-out room causes staining and wear on the interior floor of the vehicle.

Generally, the physical size of the operating mechanism or slide-out room is large and bulky and somehow has to be hidden. Concealing the operating mechanism requires space either inside the vehicle, which lessens the living space, or under the vehicle, which lessen room for the mechanical systems such as storage tanks and axles. The object of any slide-out room is to add space, so a need exists for a slide mechanism that requires no interior or exterior space.

Generally, existing mechanisms for extending and retracting slide-out rooms employ powerful hydraulic or electro-mechanical systems that have a fixed amount of working stroke. When actuated, these powerful devices will push or pull the slide room until they run out of useable stroke. When obstructions, such as trees on the exterior or furniture and suitcases on the interior, are encountered before the wholly extended or wholly retracted position is attained, the actuation mechanism has more than enough power to overcome the obstruction and keep going. This can destroy the slide-out room, which is generally made from light weight wood or aluminum tube. Sadly, sometimes human beings are encountered, often resulting in injury or death. Therefore, it is desirable that obstructions be sensed and the actuation mechanism stopped.

Tolerances needed to construct slide-out rooms are large. Therefore, the side walls of the same slide-out room rarely have the same dimensions. When one side wall is deeper than the other side wall, only the shorter side wall can be adjusted to properly seal against the weather. An example is a slide room that has one side wall built incrementally longer than the other side wall. With a fixed stroke equal to the length of the shorter side wall, the longer side is unable to attain full stroke and properly seal. This permits moisture to enter the unit and cause extensive damage. Therefore, a need exists for a slide room mechanism that can independently sense and automatically adjust stroke to a sealed position on each side of the slide room.

All known prior art for slide room mechanisms attach the actuating mechanism to the unit. Sometimes the mechanism is mounted to the floor of the unit, or to the side wall, chassis or frame of the unit. After the actuating mechanism is mounted on the unit, the slide-out room is attached. Due to natural manufacturing tolerances, the opening to accept the slide-out room typically varies from unit to unit in both height and width, while the slide-out room itself also varies in height and width. However, the seal used to keep weather out of the unit is manufactured to a set dimension. Numerous adjustments up and down and left and right are required to center the slide-out room to the opening in the unit in order to provide a weather-tight seal when the room is extended and retracted. As the unit is used, normal road vibrations tend to cause the slide-out room to come out of adjustment, allowing moisture to enter the interior of the vehicle causing extensive damage. Therefore, a need exists for a slide room mechanism that requires no mechanical adjustment, both at installation and as it is used.

SUMMARY

According to the present invention, actuating mechanisms are installed on opposite side walls of the slide-out room and the adjoining portions of the wall of the main living area through which the slide-out room extends and retracts. Each of the actuating assemblies include a pair of pinion gears mounted on a rotatable torque shaft, which are supported for rotation on the main living quarters adjacent to the aperture in the wall of the main living quarters through which the slide-out room extends and retracts. The two pinion gears rotate with a common shaft, and are meshed with the teeth of corresponding gear racks which are mounted on the adjacent side wall of the slide-out room. Rollers engage corresponding bearing surfaces defined on the racks to support the slide-out room as it extends and retracts and also to assure that the pinions remain meshed with the racks. In an optional embodiment of the invention, racks are provided with an inclined section, which permits the room to drop as it approaches the extended position to bring the floor of the slide-out room flush with the floor of the main living quarters, thereby eliminating the unsightly and inconvenient step-up between the slide-out room and the main living quarters.

BRIEF DESCRIPTION OF THE DRAWINGS

These and other aspects and advantages will be described in detail with reference to the accompanying drawings, in which:

FIG. 1 is a view in perspective of the left hand actuating assembly of the slide-out room as it is shipped from the factory for installation on the slide-out room; the right hand assembly being a mirror image thereof;

FIG. 2 is a view in perspective of a portion of the actuating mechanism illustrated in FIG. 1, with the bearing blocks and cover eliminated to show the internal torque shaft and pinions;

FIG. 3 is a view taken substantially along line 3-3 of FIG. 2;

FIG. 4C is an enlarged partial front elevational illustration of the slide-out room with the actuating assembly applied, with a portion of the assembly strap and the cover cut away to illustrate detail;

FIG. 6 is a view similar to FIG. 5, but illustrating the manner in which the slide-out room slides into the main living quarters and the manner in which the actuating assemblies are attached to the main living quarters;

FIG. 7 is a view taken substantially along line 7-7 of FIG. 6;

FIG. 8 is a view taken substantially along line 8-8 of FIG. 7;

FIG. 9 is a view in perspective of a rack used in an alternate embodiment of the invention;

FIG. 10 is a schematic illustration of the control system used to control system used to control the actuating assemblies used in the present invention.

DETAILED DESCRIPTION

Figure 4:
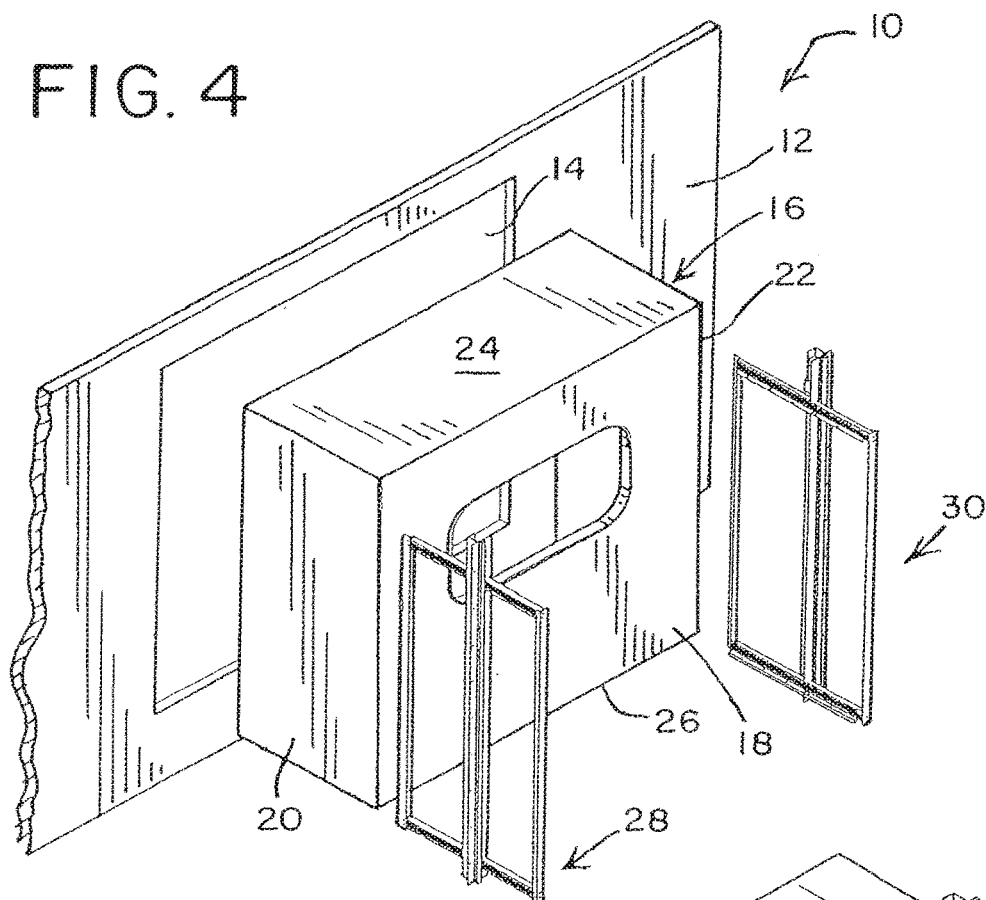
FIG. 4 is an exploded view in perspective of a recreational vehicle including a slide-out room, with actuating assemblies of the present invention shown exploded off of the sides of the slide-out room.
Figure 5:
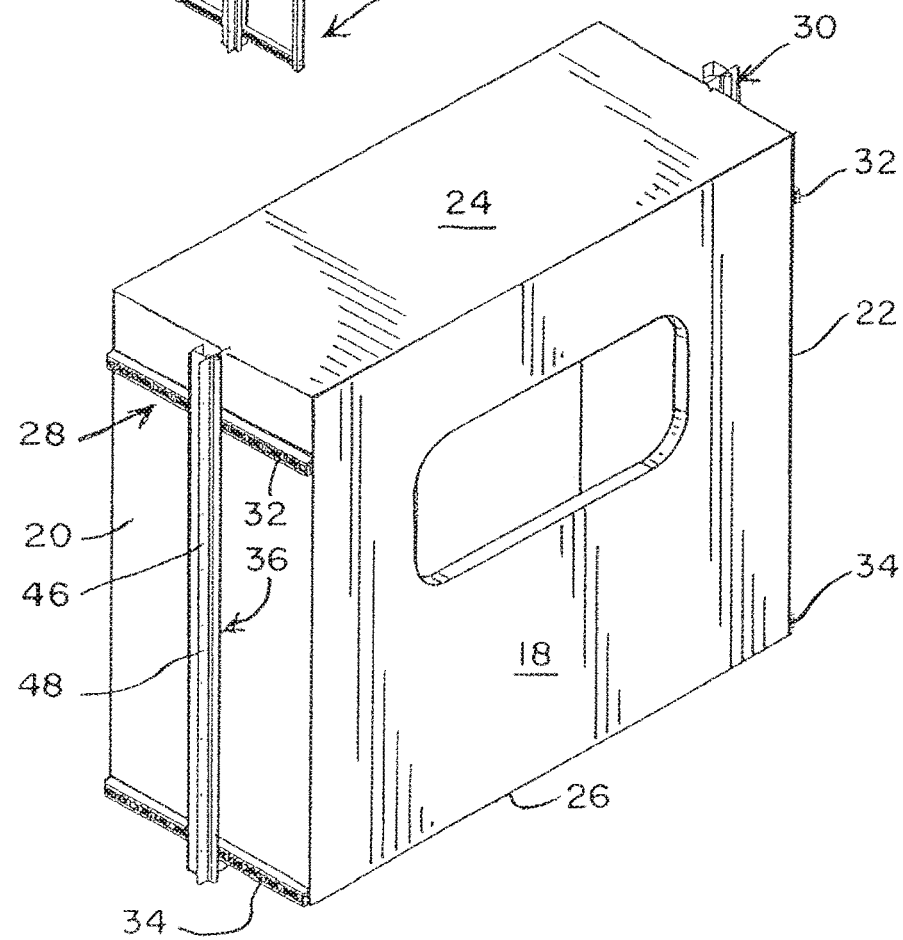
FIG. 5 is a view in perspective of a slide-out room with actuating assemblies made according to the present invention installed thereon.
Figure 4A:
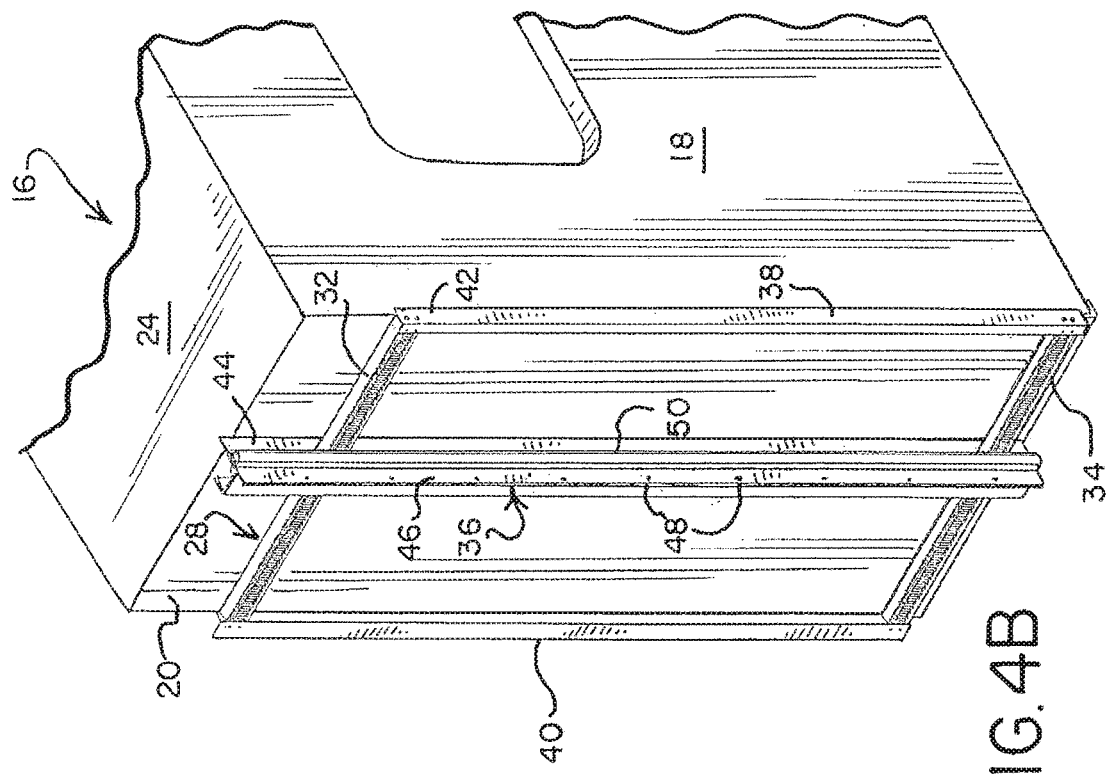
FIG. 4A is a partial perspective view of a slide-out room with the actuating assembly being applied to one side.
Figure 4B:
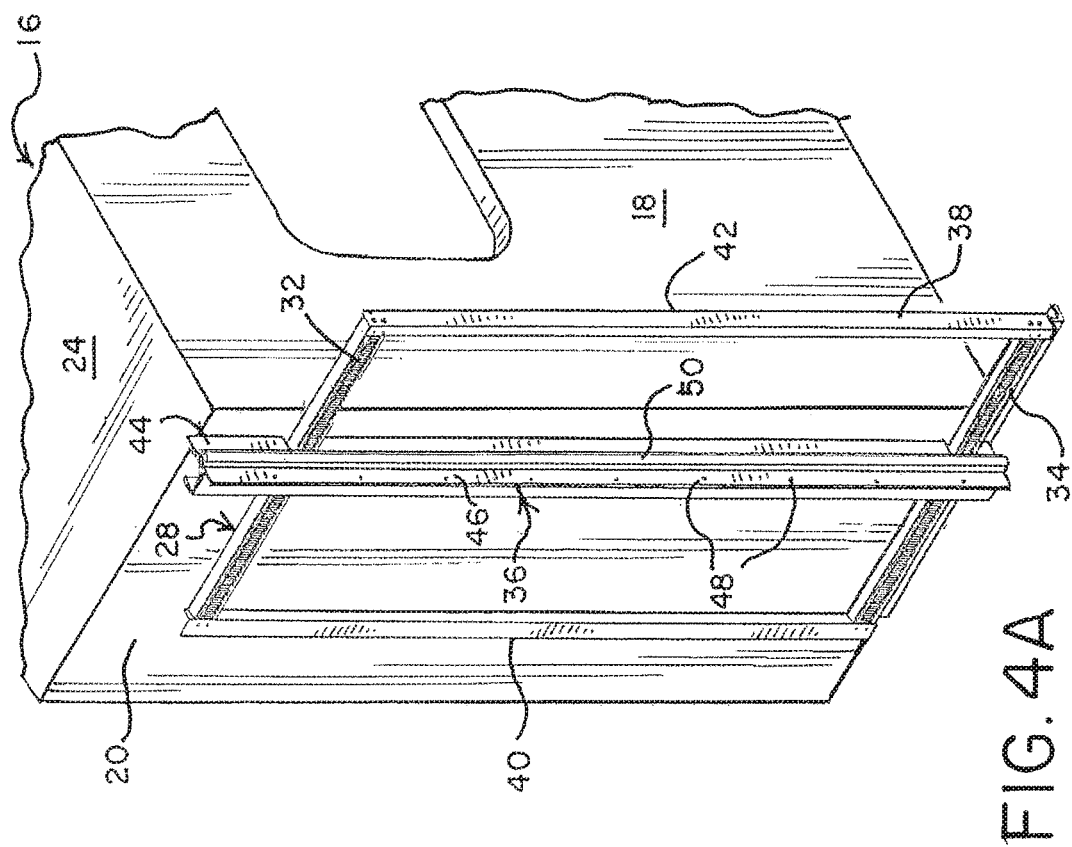
FIG. 4B is a view similar to FIG. 4A, but with the actuating assembly in place, prior to removal of the assembly straps.

Referring now to the drawings, a mobile living quarters, such as a recreational vehicle, is indicated generally at 10, and includes a side wall 12 (the remaining side walls of the vehicle 10 not being shown). Side wall 12 defines an aperture 14 through which a slide-out room generally indicated by the number 16 extends and retracts. Slide-out room 16 includes a front wall 18, two side walls 20, 22 extending from the front wall 18, a ceiling 24 and a floor 26.

Actuation assemblies 28, 30 are mounted on the side walls 20, 22 respectively, the actuation assembly 30 being a mirror image of the actuation assembly 28. As illustrated in FIGS. 1 and 4, each actuation assembly includes an upper rack 32, a lower rack 34, and a cover 36 defining a column which covers the mechanism that drives the rack 32, 34. Although rack and pinion actuators are shown, other equivalent interengaging, relatively movable members, such as welded chains and sprockets, a cog and stamping, timing belt and pulleys and other similar structures may be used; furthermore, although two rack and pinion assemblies are illustrated for each of the assemblies 28, 30, any number of assemblies may be used as necessary or convenient. Assembly straps 38, 40 are illustrated in FIGS. 1 and 4; these assembly straps are temporary to assure that the alignment of the racks 32, 34 remain parallel to each other. Assembly strap 38 includes a projecting flange 42 that projects beyond the racks 32, 34 and is adapted to engage front wall 18 of the slide-out room 16 to thereby locate actuating assembly 28 laterally with respect to the slide-out room 16. As will hereinafter be described, a bearing block covered by the cover of column 36 engages the floor 26 of the slide-out room when the actuating assembly 28 is installed to thereby locate the actuating assembly vertically with respect to the slide-out room 16. Accordingly, the actuating assemblies 28, 30 are fully assembled when they are manufactured and shipped to the assembly plant for attachment to the slide-out room 16 and to the main living quarters. Accordingly, no separate components are required, and assemblies 28, 30 are inherently self-locating. Once the actuating assemblies 28, 30 have been installed, the assembly straps 38, 40 are removed and discarded.

The column or cover 36 includes a generally u-shaped portion 44 that extends around the actuating components for the racks 32, 34, as will hereinafter be described. A flange 46 projects from the u-shaped portion 44 and is provided with apertures 48, which receive fasteners 49 used to attach the actuating assemblies to the side wall 12 adjacent to the aperture 14. In addition to concealing and protecting the actuation components, the column 36 trims up the edges of the aperture 14 and also carries a vertically extending bulb seal 50, which seals the unit when the retractable room is fully retracted into the main living area.

A splined torque shaft 52 extends substantially vertically in the cover of column 36 and is rotatably supported by a lower bearing block 54 and an upper bearing block (not shown). The upper and lower bearing blocks have been omitted from FIG. 2 for clarity and are substantially identical, so that only lower bearing block 54 will be described in detail. Bearing block 54 has been illustrated in phantom in FIGS. 3 and 7 for clarity. Torque shaft 52 is defined by circumferentially spaced splines 56, which are received in corresponding grooves in pinions 58, 60, which mesh with the gear racks 32, 34, respectively. Upper and lower gear racks 32, 34 are substantially identical, except that the lower gear rack 34 includes a flange 62 which projects therefrom and engages the lower side of the floor 26 of the slide-out room 16 to thereby locate the actuation assembly 28 vertically with respect thereto.

A roller 64, having a substantially v-shaped cross section to define bearing faces 66, 68, is rotatably mounted on a spindle 70 projecting from bearing block 54. Rollers of other complex shapes may be used instead of v-shaped rollers illustrated, it only being necessary that the rollers be shaped to control the relative positions of the rack and the roller, and to permit the slide-out room to move relative to the unit. The racks 32, 34 are each provided with a horizontally extending bearing surface defined by angled bearing faces 72, 74. The bearing faces will, of course, be shaped complementary to the cross section of the roller. A hooked extension extends from the bearing block 54 into a longitudinally extending groove 78 (FIG. 2) of the rack 34. Hooked extension 76 is covered by a low friction, plastic (Delrin) shoe 80 which rides in the groove 78 as the slide-out room extends and retracts. The shoe 80 and groove 78 maintain engagement of the roller 64 with the rack 34 and maintain engagement of the rack with the pinion. As described above, a bulb seal 50 extends along u-shaped portion 44 of the column 36. As can be seen in FIG. 8, when the slide-out room 16 is in the fully retracted position, an extension 84 carried by the slide-out room 16 engages bulb seal 50, compressing the latter, to assure a weather-tight seal protecting the pinions, torque shafts, and motor from the environment.

Figure 11:
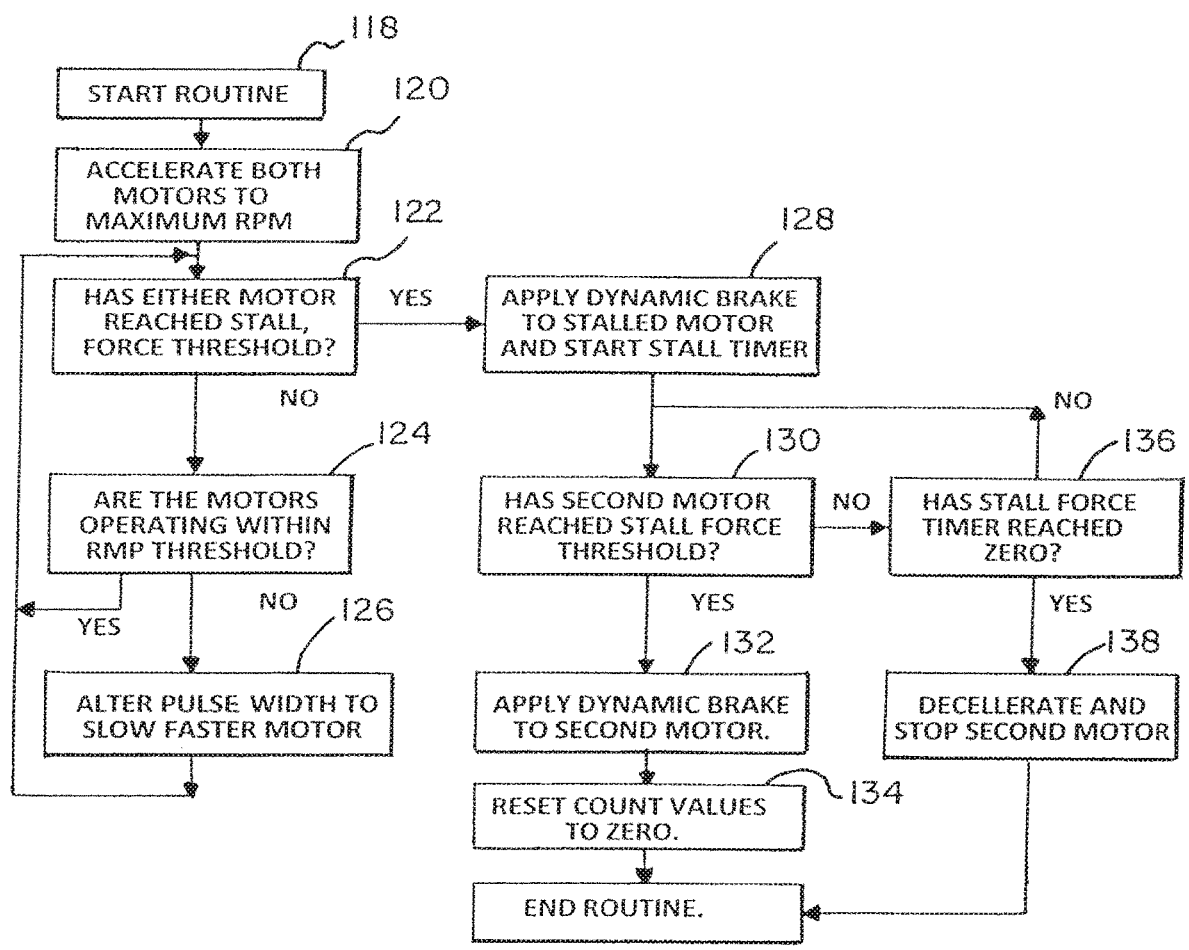
FIG. 11 is a detailed schematic of the control logic used in the control system illustrated in FIG. 10.

An electric motor 82 is supported on the upper most end of the torque shaft 52 for rotating the latter. The motor 82 is a bi-directional motor, and rotates the shaft in one direction to extend the slide-out room from the main living quarters, and in the opposite direction to retract the slide-out into the main living quarters. The actuation assembly 30 on the opposite side wall 22 is a mirror image of the actuation assembly 28. Another motor identical to the motor 83 operates actuation assembly 30. Both motors are driven by a synchronizing drive control 90, as illustrated in FIG. 10 and FIG. 11, so that both the actuating assemblies extend and retract at substantially the same rate, as will hereinafter be described. Alternatively, a transverse shaft extending over the slide-out room and connected to both torque shafts 52 by a gear drive may be used with only one motor.

Referring now to FIG. 10, synchronizing drive control 90 includes a processor 92, which transmits data to, and receives data from, a memory 94. Input bus 96 for processor 92 receives a voltage input from voltage sensor 98, current sensor inputs 100 and 102, which input signals measuring current draw of the corresponding motor, and tachometers or speed sensor inputs 104, 106, which are connected to speed sensors for each of the motors and which generate pulse trains that are proportional to the rotational speed of the motors. Other inputs include 108 and 110, which transmit a signal from a wall switch within the unit which is operated when the user desires to extend or retract the slide-out room. The effect of the inputs 108 and 110 is to reverse the direction of rotation of the motors, but operation of the system 90 is otherwise the same if the slide-out room is either extended or retracted. Processor 92 includes a pulse width modulator which generates pulse width modulated voltage signals which are transmitted to the motors through output bus 112, as indicated at 114 and 116.

Referring now to FIG. 11, when the user operates the wall switch to either extend of retract the slide-out room, the processor 92 responds by starting the control routine, as indicated at 118. Both motors are accelerated to their maximum speed, as indicated at 120, it being noted that the maximum speed of the motors may be different (due, for example, to differences in weight carried on different sides of the slide-out room). A test is made, as indicated at 122, to determine if either motor has reached the stall threshold. This is done by comparing the current draw of each motor, as sensed by sensor inputs 100 and 102. The current draw of the motors increases substantially when the motor stalls out at the end of the stroke of the slide-out room (such as when it attains the fully extended or fully retracted position, or when the slide-out room encounters an obstruction requiring greatly increased power). If both motors are operating below the stall threshold, a check is made to determine if the motors are operating within a predetermined speed range of one another, as indicated at 124. If the motors are operating outside of the speed range, the pulse width of the voltage signal to the faster motor is altered to slow the faster motor to within the speed range, as indicated at 126. If the test at 122 indicates that one of the motors has reached the stall threshold, the stalled motor is dynamically braked, as indicated at 128 (by switching terminals of the motor together), and a stall timer is started. As indicated at 130, the current draw of the other motor is then tested to determine its stall threshold has been reached. If the stall threshold of the second motor has been reached, the second motor is braked (as indicated at 132), the values of the counts from the motor speed sensors stored in memory are reset to zero (as indicated at 134), and the routine is ended. If the test made at 130 indicates the second motor has not yet stalled out, a test is made at 136 to determine if the stall timer has timed out. If the stall timer has timed out, the other motor is stopped (as indicated at 138), whereupon the routine is ended. By continuing to operate the motor not reaching the stall threshold after the first motor reaching the stall threshold has been stopped, both sides of the slide-out room are independently brought into engagement with their corresponding bulb seals 50, thus assuring sealing completely around the slide-out room. The stall force timer assures that one motor will not be operated longer than a predetermined time period after the other motor has stalled, so that if the stalling is caused by one side of the slide-out room striking an obstruction, the motor actuating the other side will not operate indefinitely, or if the clearances across the slide-out room are sufficiently different that both sides of the slide-out room cannot be sealed, the system will not be operated indefinitely.

In operation, when the user desires to extend the slide-out room 16, the motors 82 are caused to turn in a direction turning the pinions 58, 60 to cause the racks, due to their engagement therewith, to be driven outwardly with respect to the main living quarters, thereby carrying the slide-out room with the rack. Rollers 64, due to their engagement with the rack 34, carry the weight of the slide-out room and maintain the floor 26 of the slide-out room raised above the floor of the main living quarters. Accordingly, damage to the floor of the main living quarters, common in the prior arts when slide-out rooms are extended or retracted, is avoided. Since, as described above, actuating assemblies 28, 30 are shipped as a unit to the manufacturing plant, assembly and adjustment of separate components is not necessary. The slide-out room 16 is retracted into the main living quarters by causing the motor 82 to turn in the reverse direction, thereby moving the racks 32, 34 into the main living quarters, carrying the slide-out room 16 with them.

As discussed above, prior art slide-out rooms require multiple adjustments to center the slide-out room in the opening in the unit in order to provide a weather-tight seal when the room is extended and retracted, and require periodic adjustments to re-center the slide-out room to compensate for normal road vibrations. In the present invention, the actuating assemblies 28, 30 are located vertically on their corresponding side walls 20, 22 by engagement of the flange 62 with the floor 26, and are located horizontally on their corresponding side walls 20, 22 by the flange 42 of the assembly straps 38, 40. The clearance between the slide-out room and the side of the aperture 14 is set by attachment of flange 62 to the side wall 12. Since the bulb seal 50 is attached to the column 36 when the actuating assemblies 28, 30 are manufactured and proper positioning of the actuating assemblies 28, 30 on their corresponding side walls is assured, no adjustment of the slide-out room after installation on the unit is required or possible.

Slide-out rooms tend to tip downward relative to the unit when extended, and this tipping must be resisted, requiring heavier and more powerful actuators than would otherwise be necessary. In the present invention, tipping forces are transmitted through upper rack 32 and pinion 60 to apply a twisting force to the torque shaft 52, which is resisted by the torsional stiffness of the torque shaft 52. The twisting forces are transmitted through the torque shaft 52 to the lower pinion 58 and the lower rack 34, to thereby apply a countervailing force to the lower portion of the slide-out room, thereby tending to right the slide-out room. Accordingly, the power required of the motor 82 remains relatively small compared to prior art actuating mechanisms.

Referring now to FIG. 9, a modified rack 86 is provided with an upwardly inclining portion 88. The operation of the unit equipped with the inclined rack 86 is the same as in the preferred embodiment, except that when the pinion travels along the inclined section 88 the slide-out room is allowed to drop gradually, thereby bringing the floor of the slide-out room into registry with the floor of the main living quarters. The pinions are allowed axial movement along the torque shaft, thereby permitting the pinions to remain in driving engagement with the rack teeth after the inclined section 88 is reached. Instead of the hooked extension 76 and shoe 80, the unit using the inclined rack 86 is provided with a secondary roller having a v-shaped cross section (not shown). This secondary roller is much smaller than the roller 64, and engages bearing surfaces 89 in the groove 91, which extends longitudinally just above the tooth portion of the rack. The function of the secondary roller is the same as the hooked extension 76 and shoe 80.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An actuating assembly for extending and retracting a slide-out room relative to a structure, the slide-out room including a side wall, the actuating assembly comprising:
    a cover securable to the structure;
    a motor disposed in the cover;
    an output shaft coupled with the motor for rotation by the motor;
    a drive member coupled with the output shaft;
    a driven member engaging the drive member and securable to the side wall of the slide-out room; and
    a roller rotatably secured to and projecting from the cover, the roller engaging the driven member and configured to support a weight of the slide-out room.

2. An actuating assembly according to claim 1, wherein the drive member comprises a pinion and the driven member comprises a rack, and wherein the roller engages a first groove on an underside of the rack.

3. An actuating assembly according to claim 2, wherein the first groove on the underside of the rack has a predefined shape, and wherein the roller has a cross-section that is shaped in complement to the predefined shape.

4. An actuating assembly according to claim 3, wherein the cross-section of the roller is v-shaped.

5. An actuating assembly according to claim 2, further comprising a bearing block disposed in the cover and fixed relative to the slide-out room, wherein the roller is rotatably secured to the bearing block.

6. An actuating assembly according to claim 5, further comprising a hooked extension fixed to the bearing block, the hooked extension slidably engaging a second groove on a top side of the rack.

7. An actuating assembly according to claim 1, wherein the drive member comprises an upper pinion and a lower pinion and the driven member comprises an upper rack and a lower rack, each of the upper and lower racks including a groove on an underside thereof, the actuating assembly comprising two rollers, one each engaging the grooves of the upper and lower racks, respectively.

8. An actuating assembly according to claim 7, further comprising a first assembly strap connected between a first end of the upper rack and a first end of the lower rack, and a second assembly strap connected between a second end of the upper rack and a second end of the lower rack, wherein the first and second assembly straps are correspondingly sized such that the upper rack is parallel to the lower rack.

9. An actuating assembly according to claim 8, wherein one of the first assembly strap and the second assembly strap includes a projecting flange configured to locate the actuating assembly laterally with respect to the slide-out room.

10. An actuating assembly according to claim 7, wherein the lower rack further comprises a flange projecting therefrom for engagement with a floor of the slide-out room.

11. An actuating assembly according to claim 1, wherein the drive member comprises a pinion and the driven member comprises a rack, the pinion including a central opening with internal grooves, wherein the output shaft comprises splines engaging the internal grooves.

12. An actuating assembly for extending and retracting a slide-out room relative to a structure, the slide-out room including a side wall, the actuating assembly comprising:
    a cover securable to the structure;
    a motor disposed in the cover;
    an output shaft coupled with the motor for rotation by the motor;
    a drive member coupled with the output shaft;
    a driven member engaging the drive member and securable to the side wall of the slide-out room;
    a roller rotatably secured to the cover, the roller engaging the driven member and configured to support a weight of the slide-out room; and
    a bearing block disposed in the cover and fixed relative to the slide-out room, wherein the roller is rotatably secured to the bearing block.

13. An actuating assembly according to claim 12, further comprising a hooked extension fixed to the bearing block, the hooked extension slidably engaging the driven member.

14. An actuating assembly according to claim 1, wherein the column comprises a flange securable to the structure and a seal positioned on a side thereof facing the slide-out room.

15. An actuating assembly according to claim 1, wherein the slide-out room includes two side walls, and wherein the actuating assembly comprises two of each of the cover, the motor, the output shaft, the drive member, the driven member and the roller, the actuating assembly further comprising:
    current sensors for each of the motors that measure a current draw for each of the motors;
    tachometers for each of the motors that generate pulse trains proportional to a rotational speed of the motors; and
    a synchronized drive control cooperable with the drive motors and receiving inputs from the current sensors and the tachometers, the synchronized drive control effecting operation of the motors so that components of the actuating assembly on opposite sides of the slide-out room operate at the same rate.

16. An actuating assembly according to claim 15, wherein the synchronized drive control is programmed to determine whether the motors have reached a stall threshold based on output from the current sensors, wherein when one of the motors has reached the stall threshold and the other motor has not reached the stall threshold, the synchronized drive control is programmed discontinue operation of the other motor after a predetermined time.

17. A method of installing an actuating assembly for extending and retracting a slide-out room relative to a structure, the slide-out room including a side wall, the method comprising:
(a) securing a cover to the structure, the cover housing a motor and an output shaft coupled with the motor for rotation by the motor;
(b) connecting an upper pinion and a lower pinion to the output shaft;
(c) connecting a first assembly strap between a first end of an upper rack and a first end of a lower rack;
(d) connecting a second assembly strap between a second end of the upper rack and a second end of the lower rack;
(e) with the first and second assembly straps secured between the upper rack and the lower rack, securing the upper and lower racks to the side wall of the slide-out room and engaging the upper and lower pinions with the upper and lower racks, respectively; and
(f) after step (e), detaching the first and second assembly straps.

18. A method according to claim 17, wherein step (e) further comprises engaging respective rollers rotatably secured to the cover with grooves on an underside of the upper and lower racks, respectively, the rollers being configured to support a weight of the slide-out room.

19. A method according to claim 17, wherein one of the first assembly strap and the second assembly strap includes a projecting flange, and wherein step (e) is practiced using the projecting flange to locate the actuating assembly laterally with respect to the slide-out room.

20. A method according to claim 19, wherein the lower rack further comprises a lower flange projecting therefrom, and wherein step (e) is further practiced using the lower flange to locate the actuation assembly vertically with respect a floor of the slide-out room.

* * * * *